(12) United States Patent
Shannon

(10) Patent No.: US 6,962,022 B2
(45) Date of Patent: Nov. 8, 2005

(54) SUSPENDED BARRIER FOR A PLANT POT

(76) Inventor: Sandy S. Shannon, 1317 E. Crystal Lake Rd., Burnsville, MN (US) 55306

( * ) Notice: Subject to any disclaimer, the term of this patent is extended or adjusted under 35 U.S.C. 154(b) by 0 days.

(21) Appl. No.: 10/457,534

(22) Filed: Jun. 10, 2003

(65) Prior Publication Data
US 2004/0065010 A1 Apr. 8, 2004

Related U.S. Application Data

(60) Provisional application No. 60/415,760, filed on Oct. 4, 2002.

(51) Int. Cl.⁷ .............................................. A01G 9/02
(52) U.S. Cl. .............................................. 47/79; 47/80
(58) Field of Search .............................. 47/65.6, 79, 80, 47/81, 82; D11/152, 153

(56) References Cited

U.S. PATENT DOCUMENTS

| 4,291,493 | A | * | 9/1981 | Monson ........................... 47/14 |
| 4,663,884 | A | * | 5/1987 | Zeischegg et al. ........... 47/59 R |
| 4,860,491 | A | * | 8/1989 | Panuski ....................... 47/65.6 |
| D352,479 | S | * | 11/1994 | Carlson ....................... D11/153 |
| D352,480 | S | * | 11/1994 | Carlson ....................... D11/153 |

FOREIGN PATENT DOCUMENTS

| CH | 160979 | * | 7/1933 |
| DE | 605947 | * | 11/1934 |
| EP | 0769243 | * | 4/1997 |
| GB | 103027 | * | 1/1917 |

\* cited by examiner

Primary Examiner—Kurt Rowan
Assistant Examiner—David J. Parsley
(74) Attorney, Agent, or Firm—Richard C. Litman

(57) ABSTRACT

A suspended barrier for a plant pot. The suspended barrier for a plant pot is designed for plant pots with sloping inner walls, placed within the plant pot and against the inner walls of the plant pot. The suspended barrier is made up of a generally concave polygon with a plurality of apertures, that holds a layer of soil above the generally concave polygon, and with the plant pot forming an enclosed air space below the generally concave polygon, the plurality of apertures being small enough to allow water from the layer of soil above the generally concave polygon to seep through the generally concave polygon into the enclosed air space below, while holding the layer of soil above the generally concave polygon.

10 Claims, 3 Drawing Sheets

SUSPENDED BARRIER FOR A PLANT POT

CROSS-REFERENCE TO RELATED APPLICATION

This application claims the benefit of U.S. Provisional Patent Application Ser. No. 60/415,760, filed Oct. 4, 2002.

BACKGROUND OF THE INVENTION

1. Field of the Invention

The present invention relates to plant pots and, more particularly, to a suspended drain for a plant pot.

2. Description of Related Art

Gardening is a favorite American and worldwide pastime. Millions of people derive pleasure from gardens, whether they are large or small. There are thousands of devices that can be used to simplify and make gardening easier, especially for the novice gardener. Many of these devices are outlined in the related art.

U.S. Pat. No. Des. 456,304 issued to Riley et al., outlines an ornamental design for a flower float.

U.S. Pat. No. 1,600,055 issued to Meyer, outlines the use of a flowerpot saucer, which will insure a generous circulation of air between the base of a flowerpot and a saucer. The saucer is molded out of soft rubber, which is durable, flexible and capable of severe usage and will not scratch or mark the table upon which it rests.

U.S. Pat. No. 2,206,694 issued to Greene, outlines the use of a base, such as a saucer or a tray, for a conventional flower pot, in which the novel construction, involving the use of a sunken bottom that is pitched towards the center of the saucer, is attained by the provision of a plurality of ribs of a particular disposition and configuration, on both the inner and outer surfaces of the bottom of the saucer or tray.

U.S. Pat. No. 4,739,581 issued to Jarvis, outlines a flowerpot having a drainage tray, an outer shell supported on the drainage tray, an upper insert, a lower insert and a top block. The upper insert is disposed between the lower insert and the top block. A soil groove is provided in the upper insert for receiving soil to determine the wetness of the soil above the top block.

U.S. Pat. No. 4,803,806 issued to Ito, outlines the use of an ornamental flower bed base assembly or matrix material, with a flower bed base plate, having a plurality of insertion holes disposed at appropriate intervals, and a plurality of flower plant holders, each having a sidewall provided with irrigation orifices and an open top end, with each of the flower plant holders being removably engageable with the respective insertion holes of the base plate.

U.S. Pat. No. 5,042,197 issued to Pope, outlines the use of a container for plants defined by a bottom, sidewalls, and a drainage riser extending interiorly from the bottom, the riser having drainage openings adjacent to the exterior extremity and including an opening communicating through the bottom. A removable plug is provided for closing the bottom opening, as desired. A plant support and drainage platform is removably fitted across the enclosure, above the extremity of the drainage riser, so as to define a plenum between the drainage platform and the riser.

U.S. Pat. No. 5,315,783 issued to Peng, outlines the use of a flowerpot with a water/soil separative planting system, which consists of self-water storage and drainage facilities, to constantly maintain an adequate amount of moisture for the plant in the pot, so that rotting or withering of the plant may be avoided.

U.S. Pat. No. 5,321,909 issued to Loran, outlines the use of a support device for plant and flower containers, that distributes the weight of the container on substrata, using a plurality of support members, while providing air circulation between the container and substrata, to deter compression of substrata and formation of mildew, mold and fungus on the substrata.

U.S. Pat. No. 5,341,596 issued to Kao, outlines the use of a potted plant having a housing incorporated in a reservoir therein. A plurality of supporting ribs is provided in the reservoir, with a disk member being supported above the reservoir by being positioned on the supporting ribs. The disk member further includes a plurality of draining holes formed through its periphery. An observation hole is also formed through the polygon member for measuring the water level in the reservoir.

U.S. Pat. No. 5,782,035 issued to Locke et al., outlines the use of an automatic filing basin, provided for containing a selected amount of water, which is used for various purposes. The water may be transferred from the basin by wicks or by a pump to water, using devices such as plant pots or toys, to be provided for direct use from basin devices, such as animal feeders and habitats. The basin is kept supplied with water from a pressurized source by a specialized valve, which opens in response to a drop in water level below a first selected level, and closes in response to the water level reaching a second selected level.

U.S. Pat. No. 5,921,025 issued to Smith, outlines the use of a self-watering plant pot made up of an outer pot, a liner of translucent or semi-translucent material that fits within the outer pot, a soil platform assembly that divides the liner into a soil compartment and a water reservoir, an optional float positioned in the water reservoir, and a water delivery channel for allowing water and air to be introduced into the water reservoir. The water delivery channel can be a water delivery tube extending upward from the soil platform.

U.S. Pat. No. 6,038,814 issued to Miotto, outlines the use of a container for cultivating and then displaying ornamental plants and flowers, made up of an outer vessel essentially divided into two parts, namely a lower part for containing water and an upper part for receiving the soil and the plant roots, the parts being separated by a horizontal wall, through which clay elements extend into the two parts.

U.S. Pat. No. 6,125,579 issued to Pavelka, outlines the use of planters and the proper drainage and watering of living plants kept within such planters, and more particularly, to a drainage and support insert for planters, which improves the drainage of water from the soil of potted plants, while maintaining a reservoir of water below the surface of the insert.

Great Britain patent number 2095083 granted to Ngau, outlines the use of an apparatus, for supplying a plant with water made up of an outer receptacle containing an inner receptacle, the outer receptacle having a platform therein for supporting the inner receptacle and for defining a lower chamber, for containing the water and a float valve, for controlling the supply of water to the chamber. The platform and a base of the inner receptacle are provided with apertures, through which passes a wick for feeding water from the lower chamber through the inner receptacle.

Although each device outlined in the previously discussed patents are novel and useful, these devices are complicated and often add weight to an already heavy plant pot. What is really needed is a device, which can help keep moisture within the soil of a potted plant, while reducing the weight of the potted plant. Such a device would be very valuable to those persons who work with and use potted plants.

None of the above inventions and patents, taken either singly or in combination, is seen to describe the instant invention as claimed.

SUMMARY OF THE INVENTION

The invention is a suspended barrier for a plant pot. The suspended barrier is designed for plant pots with sloping inner walls, and is placed within the plant pot and against the inner walls of the plant pot. The suspended barrier is made up of a generally concave polygon with a plurality of apertures, that hold a layer of soil above the generally concave polygon. The polygon is dimensioned such that an enclosed air space is formed within the pot, below the generally concave polygon, with the plurality of apertures being small enough to allow water from the layer of soil, above the generally concave polygon, to seep through the generally concave polygon into the enclosed air space below, while holding the layer of soil above the generally concave polygon.

Accordingly, it is a principal object of the invention to provide a device to keep plants in a plant pot from getting too much water.

It is another object of the invention to eliminate the need for putting more potting soil in a plant pot than what is normally needed.

It is a further object of the invention to reduce the weight of the potting soil used with a plant pot.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
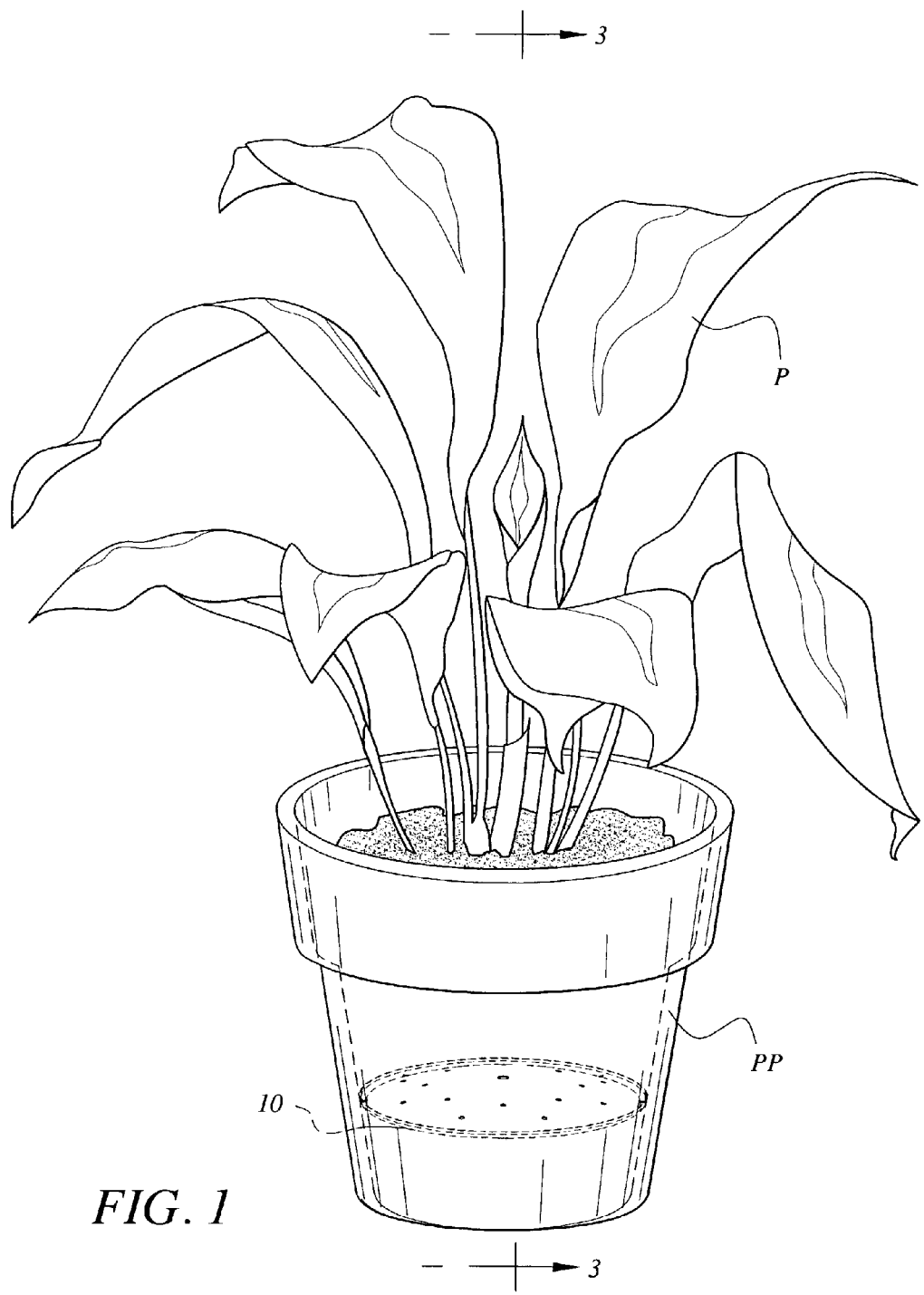
FIG. 1 is an environmental, perspective view of a suspended barrier for a plant pot according to the present invention.

The present invention is a suspended barrier 10 for a plant pot PP with sloping inner walls, placed within the plant pot PP and against the inner walls of the plant pot PP. Standard plant pots PP are provided with sloping inner walls, regardless of size and whether they be clay or plastic, although plastic plant pots PP have a more vertical slope than clay plant pots PP. FIG. 1 illustrates a standard plant pot PP with a plant P and a corresponding suspended barrier 10.

The suspended barrier 10 comprises, a generally concave polygon 20 with a plurality of apertures 30, that holds a layer of soil S above the generally concave polygon 20, and defines with the interior of the pot, an enclosed air space A (see FIG. 3) below the generally concave polygon 20. The plurality of apertures 30 are small enough to allow water from the layer of soil S above the generally concave polygon 20, to seep through the generally concave polygon 20 into the enclosed air space A below, while holding the layer of soil S above the generally concave polygon 20. The suspended barrier 10 is manually removable and can be manually inserted in the plant pot PP, where the perimeter of the false bottom 40 makes contact with the inner sides, and supports itself against gravity and the weight of the soil S and plant P. A specific illustration and details pertaining to the suspended barrier 10 are depicted in FIG. 2.

Figure 2:
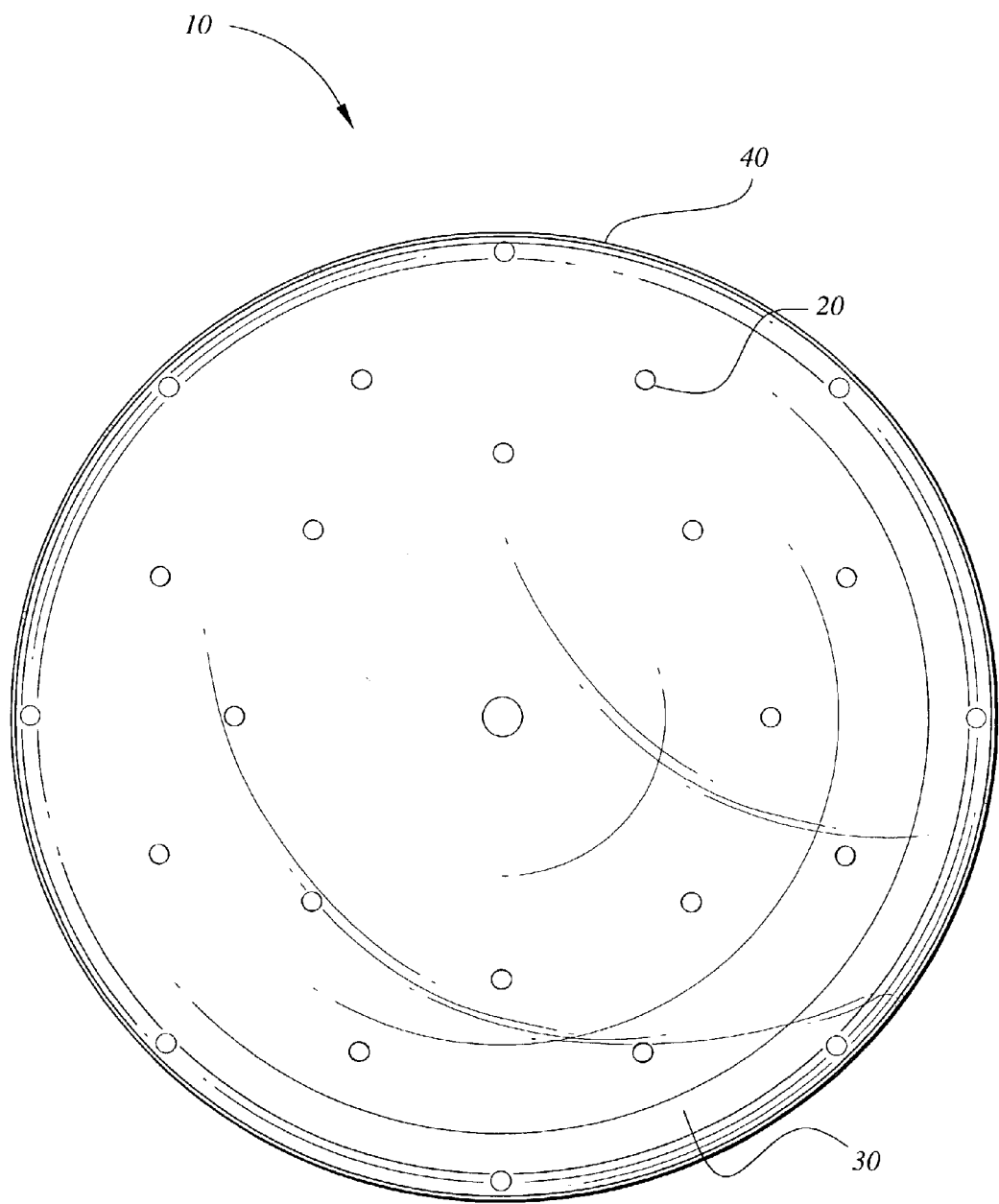
FIG. 2 is an overhead perspective view of a suspended barrier for a plant pot.
Figure 3:
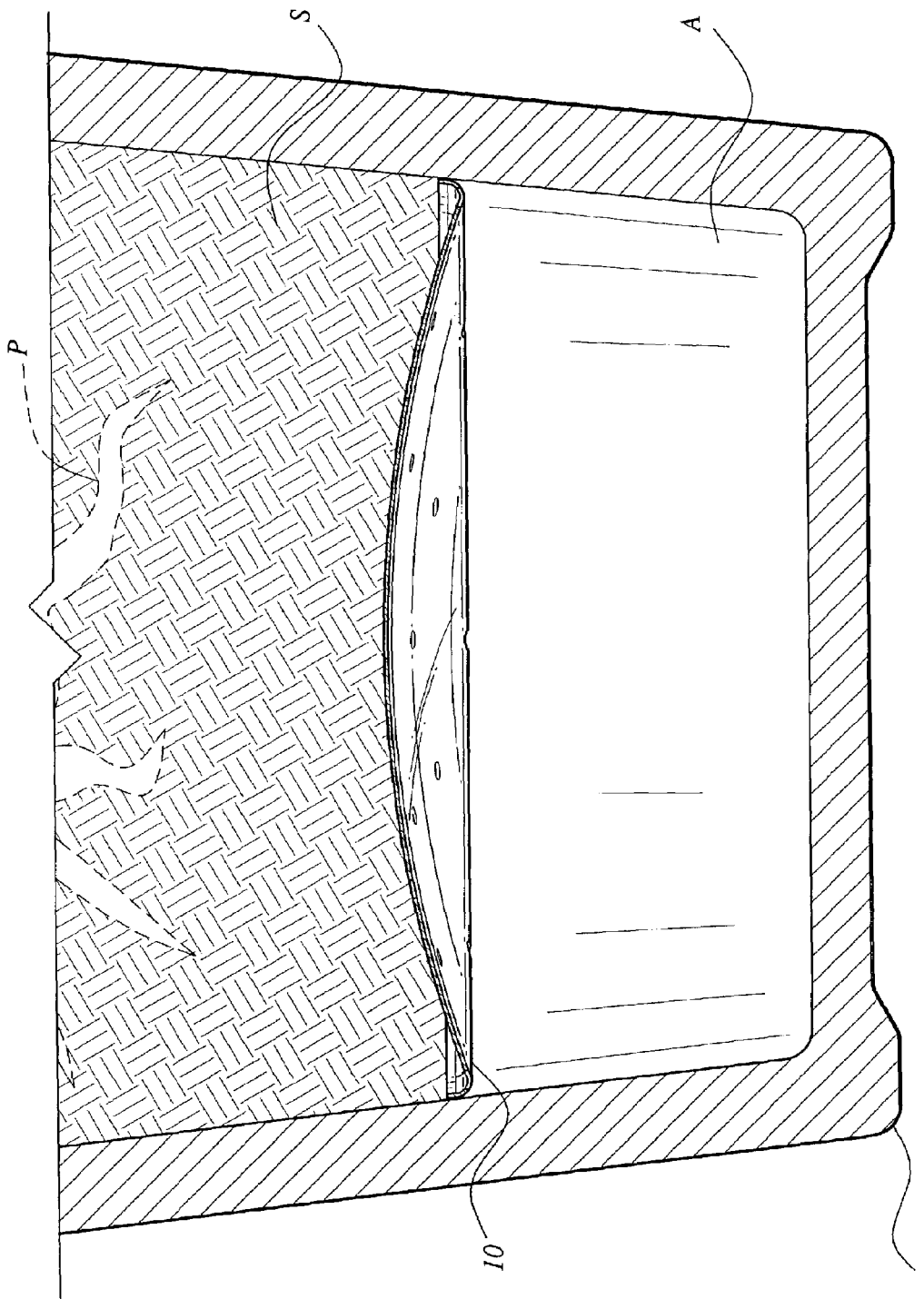
FIG. 3 is a cross-sectional view along line 3—3 of FIG. 1, of a suspended barrier for a plant pot.

In a preferred arrangement as clearly seen in FIGS. 1–3, the barrier 10 includes a disk 20 having a substantially circular outer perimeter 40. The disk 20 defines a plurality of apertures 30 therethrough. The disk 20 has a generally concave lower surface 20', and a generally convex upper surface 20". The substantially circular outer perimeter 40 defines a flange 40' which extends in the direction of the convex upper surface 20", and defines a substantially concave recess region 40' surrounding the convex upper surface 20". The disk 20 is frictionally disposed in a plant pot by the engagement of the flange 40 with the inner wall of the plant pot PP. In this fashion, a layer of soil S is supported on the convex upper surface 20" of the disk, and an enclosed air space A is defined below the generally concave lower surface 20'. The plurality of apertures 30 allow water to percolate through the layer of soil S and into the enclosed air space A, and simultaneously maintain the layer of soil S above the disk 20.

As is shown in FIG. 3, the suspended barrier 10 is made of strong thermoplastic material, that can comfortably support the weight of the soil S and the plant P, while allowing excess water to run through the soil S and into the enclosed air space A. This keeps the soil S from getting too wet, and thus from having too much moisture, which is a common gardening problem for potted plants. The suspended barrier 10 also eliminates the need for more potting soil than is normally needed, and significantly reduces the overall weight of the potted plant. This is a particularly important benefit of using the suspended barrier 10, making hanging the plant much easier, or moving it about a lot easier, since there are so many gardeners that have a hard time moving heavy potted plants.

The suspended barrier 10 is easier to manufacture and use then the more sophisticated devices described in related art that were previously discussed. The suspended barrier 10 is made in a number of different sizes, to accommodate large-sized, medium-sized and small-sized plant pots, or any size of pot for that matter. The plurality of apertures 30 on the generally concave polygon 20 are approximately 0.125" in diameter, while the thickness of the generally concave polygon 20 is approximately 0.06". The suspended barrier 10 is made of thermoplastic material, preferably, that can easily support the weight of the plant P and potting soil S. Such thermoplastic material is well-known to those having skill in the related art. Other materials, however, including but not limited to metal, clay, wood, etc. are certainly suitable for fabrication of the invention.

The suspended barrier 10 can be used alone or in combination with a plant pot PP. The suspended barrier 10 comes in a variety of sizes to accommodate a large variety of different plant pot PP sizes. The suspended barrier 10 is manually placed down into a plant pot PP that has an inward sloping perimeter. The suspended barrier 10 is placed against the inward sloping sidewalls of the plant pot PP, and is above the very bottom of the plant pot PP. The suspended barrier 10 resists rotting and disintegration from moisture and wet soil, and is made from durable thermoplastic material.

It is to be understood that the present invention is not limited to the embodiments described above, but encompasses any and all embodiments within the scope of the following claims.

I claim:

1. A barrier, for a plant pot with sloping inner walls, placed within the plant pot and against the inner walls of the plant pot, comprising:
    a disk made of a single piece construction and having a substantially circular outer perimeter;
    said disk defining a first plurality of circular apertures distributed substantially throughout the disk;
    said disk having a generally convex upper surface, and a generally concave lower surface, at least one of the first plurality of apertures being centrally disposed in said disk, and extending from said upper surface through said disk to said lower surface;
    said substantially circular outer perimeter defining a flange extending in the direction of said convex upper surface, said flange defining a substantially concave region surrounding said convex upper surface, and a second plurality of circular apertures being uniformly distributed substantially in a lowermost portion of the concave region surrounding the convex upper surface;
    wherein said disk being disposed such that a layer of soil is supported on said convex upper surface of said disk, and defines an enclosed air space below the generally concave lower surface, said first and second plurality of apertures allowing water to percolate through the layer of soil and into the enclosed air space, and simultaneously maintaining the layer of soil above said disk;
    whereby said flange frictionally engaging the inner walls of the plant pot, and is supported within the plant pot entirely by the frictional engagement.

2. The barrier according to claim 1, wherein the disk is configured to be removably inserted in the plant pot.

3. The barrier according to claim 1, wherein the apertures defined in said disk are on the order of 0.125" in diameter.

4. The barrier according to claim 1, wherein the disk is on the order of 0.06" in thickness.

5. The barrier according to claim 1, wherein the disk is made of thermoplastic material.

6. A combination planter and barrier for use therein, comprising:
    a plant pot having generally sloping inner walls; and
    a disk made of a single piece construction and having a substantially circular outer perimeter, and defining a first plurality of apertures distributed substantially throughout the disk;
    said disk having a generally convex upper surface, and a generally concave lower surface, at least one of the first plurality of circular apertures being centrally disposed in said disk, and extending from said upper surface through said disk to said lower surface;
    said substantially circular outer perimeter defining a flange extending in the direction of said convex upper surface, said flange defining a substantially concave region surrounding said convex upper surface, and a second plurality of circular apertures being uniformly distributed substantially in a lowermost portion of the concave region surrounding the convex upper surface;
    wherein said disk being disposed such that a layer of soil is supported on said convex upper surface of said disk, and defines an enclosed air space below the generally concave lower surface, said first and second plurality of apertures allowing water to percolate through the layer of soil and into the enclosed air space, and simultaneously maintaining the layer of soil above said disk;
    whereby said flange frictionally engaging the inner walls of the plant pot, and is supported within the plant pot entirely by the frictional engagement.

7. The barrier according to claim 6, wherein said disk is configured to be removably inserted in said plant pot.

8. The barrier according to claim 6, wherein said apertures defined in said disk are on the order of 0.125" in diameter.

9. The barrier according to claim 6, wherein the disk is on the order of 0.06" in thickness.

10. The barrier according to claim 6, wherein the disk is made of thermoplastic material.

* * * * *